(12) United States Patent
Morris et al.

(10) Patent No.: US 6,685,785 B1
(45) Date of Patent: Feb. 3, 2004

(54) SYNCHRONOUS DRIVE BELT WITH SCAFFOLD STRETCH FABRIC

(75) Inventors: Matthew Thomas Morris, Lincoln, NE (US); Wei Willie Chien, River Edge, NJ (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/762,503

(22) PCT Filed: Sep. 29, 1998

(86) PCT No.: PCT/US98/20601
§ 371 (c)(1),
(2), (4) Date: Jun. 11, 2001

(87) PCT Pub. No.: WO00/19123
PCT Pub. Date: Apr. 6, 2000

(51) Int. Cl.[7] .................................................. F16G 1/28
(52) U.S. Cl. .................. 156/137; 156/139; 474/266; 474/267; 474/268
(58) Field of Search .................. 156/137, 139; 474/205, 237, 260, 262, 264, 266, 267, 268

(56) References Cited

U.S. PATENT DOCUMENTS

| | | | |
|---|---|---|---|
| 4,108,011 A | 8/1978 | Gregg et al. | 74/229 |
| 4,690,664 A | 9/1987 | Wetzel | 474/205 |
| 4,891,040 A * | 1/1990 | Nagai et al. | 474/267 |
| 5,209,705 A | 5/1993 | Gregg | 474/204 |
| 5,501,643 A | 3/1996 | Isshiki et al. | 474/268 |
| 5,545,097 A | 8/1996 | Kitazumi et al. | 474/266 |
| 5,609,541 A | 3/1997 | Tachibana et al. | 474/205 |
| 5,645,504 A | 7/1997 | Westhoff | 474/250 |
| 5,733,399 A | 3/1998 | Wood | 156/138 |
| 5,860,883 A * | 1/1999 | Jonen et al. | 474/205 |

FOREIGN PATENT DOCUMENTS

EP 0637704 2/1995 ............. F16G/1/28

* cited by examiner

Primary Examiner—Jeff H. Aftergut
Assistant Examiner—Todd J. Kilkenny
(74) Attorney, Agent, or Firm—Nancy T. Krawczyk

(57) ABSTRACT

A belt (1), and a method of forming a belt (1), with at least one row of teeth (5) formed on at least one surface of the betling (1). To improve the tooth formation of the belting (1), and the abrasion of the belting (1), the outer surface of the teeth (4) are formed with the disclosed bi-directional stretch woven fabric (7). The warp (10) and weft (11) yarns are formed of a core yarn (12) about which is helically wrapped at least one yarn (13 or 14), forming a scaffold construction. The bi-directional stretch characteristics of the fabric (7) permit greater deformation of the fabric (7) while forming the belt teeth (5).

16 Claims, 1 Drawing Sheet

SYNCHRONOUS DRIVE BELT WITH SCAFFOLD STRETCH FABRIC

TECHNICAL FIELD

The present invention relates to a synchronous drive belt designed for improved tooth formation. More specifically, the present invention is directed toward a fabric covering layer for the synchronous drive belt for improved tooth formation.

BACKGROUND ART

Conventional synchronous drive belts have teeth placed at right angles to the belt mid-circumferential line. Such belts are well illustrated in U.S. Pat. Nos. 4,108,011 and 4,690,664. In these known prior art belts, the whole tooth engages with a corresponding pulley cavity at the same time.

U.S. Pat. No. 5,209,705 discloses a synchronous drive belt with at least two transversely adjacent rows of teeth, having centerlines, uniformly spaced apart in the longitudinal direction by a pitch length and extending obliquely to the longitudinal directional. The teeth in the transversely adjacent rows are at oppositely balanced angles and the centerlines of said adjacent teeth are offset from each other by a distance of from 10% to 90% of the pitch length. Such belts are known in shorthand terminology as helical-offset-tooth belts or HOT belts.

Prior art conventional belts and helical-offset-tooth belts of U.S. Pat. No. 5,209,705, for the purpose of wear resistance, are provided a stretchable fabric material on the outer surface of the belt teeth. Known abrasion resistance fabrics employed in the art are cotton, cotton-nylon blend, nylon, aramid, aramid-rayon blend, acrylic, acrylic-rayon blend, polyester, polyester-cotton blend and rayon. The selected fabric preferably has a thermal stability up to at least 500° F.

U.S. Pat. No. 5,645,504 discloses the use of a knitted fabric with a 1×1-rib construction for use in conventional synchronous belts of the first type previously described. The selected fabric has a pleated structure allowing stretch in a direction transverse to the knitted ribs. The fabric is stretched, in use, from about 15% to about 200%. During formation of the belt, the ribs of the fabric are oriented to extend transverse to the belt direction and aligned with the teeth. U.S. Pat. No. 5,545,097 discloses a tire belt with a resorcinol-formalin-latex (RFL) solution treated facing fabric. The facing fabric is a woven fabric with the warp threads running transverse to the belt direction, aligned with the teeth, and the weft threads running in a lengthwise direction. The fabric is plain weave, twill weave, satin weave or the like. The fabric is initially shrunk to about fifty percent of the original width, immersed in RFL solution, squeezed, and then dried. If necessary the fabric may by dipped in RFL again to obtain a desired 30–50% solid RFL attachment to the fabric.

U.S. Pat. No. 5,609,541 discloses a tooth facing fabric treated with a rubber composition in which hydrogenated acrylonitrile-butadiene rubber is mixed with N,N'-m-phenylenedimaleimide.

Single directional scaffold construction fabric, permitting stretch in the single direction, has also been employed as abrasion resistant fabric in synchronous belt constructions, as disclosed in U.S. Pat. No. 5,501,643.

While all the prior art fabrics provide acceptable abrasion resistance for conventional belts with transversely extending teeth, greater tooth profiling can be achieved by use of a bi-directional stretch fabric as further disclosed in the present invention. Such a fabric is especially suited for belts of the type disclosed in U.S. Pat. No. 5,209,705.

For the inclined centerline teeth of the HOT belt, the surface face of the teeth varies in both the transverse and longitudinal direction of the belt. When a single directional stretch fabric is laid with the weft threads parallel to the longitudinal of the belt, no consideration is provided for the variation of the belt surface in the transverse direction. The inventive use of a bi-directional fabric as disclosed herein provides for surface variation in both directions, and enables better tooth profiling. The inventive aspect of the disclosed invention is also applicable to non-inclined teeth for synchronous drive belts.

SUMMARY OF THE INVENTION

The present invention is directed toward improved tooth formation in belting. The disclosed invention is applicable in tooth formation of conventional straight toothed belts and helically-offset tooth belts.

The disclosed fabric is stretchable in both directions, and may have greater stretch characteristics in one direction than in the opposing direction.

The disclosed invention is obtained by providing the belting with an outer tooth reinforcement layer of a woven bi-directional stretch fabric. The woven fabric, comprising warp and weft threads, is of a scaffold construction.

Each warp and weft thread of the bi-directional stretch fabric is provided with a core yarn about which is helically wrapped at least one yarn, permitting relative movement of the core yarn within the wrap of the second yarn.

BRIEF DESCRIPTION OF DRAWINGS

The invention will be described by way of example and with reference to the accompanying drawings in which.

DETAILED DESCRIPTION OF THE INVENTION

Figure 1:
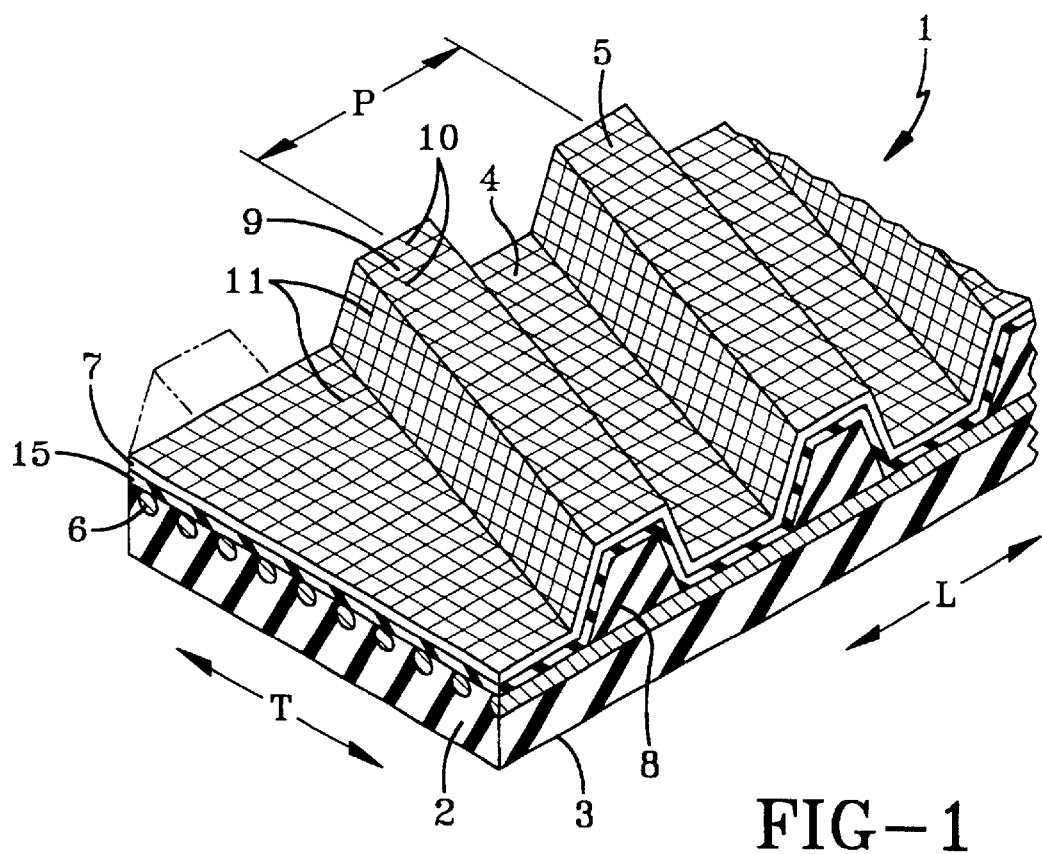
FIG. 1 is a cross-sectional view of one embodiment of the disclosed belting.

As illustrated in FIG. 1, the power belt 1 has a belt body 2, with an inner surface 3, and an outer facing toothed surface 4. The outer facing surface 4 has at least one row of adjacent rows of teeth 5. The belt body 2 is made of a resilient elastomer and preferably reinforced with longitudinal tensile members 6 which lie along the belt longitudinal direction L. The inner surface 3 of the belt 1 may also be formed with teeth 5, forming a dual sided belting.

The elastomer for the belt body 2 may be any one of those known to be suitable for use in such belts, e.g., polychloroprene, polyurethane, BBR, IIR, IR, SBR, CSM, EPDM, other thermosets, thermoplastic elastomers and other polymer alloys. The tensile reinforcing members 6 are usually made of a plurality of cords of a high elastic modulus. These cords may be made from glass fiber, carbon fiber, steel, polyester, high tenacity rayon or preferably, polyaramide. If the belt is to be used for automotive applications, the tensile members are typically made using glass fibers.

The illustrated teeth 5 are uniformly spaced apart in the longitudinal direction L by a pitch length P, the pitch length P extending from one tooth centerline to the adjacent tooth centerline. The teeth S may extend obliquely to the longitudinal direction L. When the teeth 5 are so inclined the oblique inclination angle of the teeth ranges from 15° to 45°.

The belt surface 4 may be defined by several adjacent rows of teeth 5. When the belt 1 is defined by plural rows of adjacent teeth, the centerlines of the transversely adjacent teeth 5 are offset from each other by a distance of 10% to 90% of the pitch length P. Additionally, if the adjacent rows of teeth 5 are obliquely inclined, the teeth 5 in the transverse adjacent rows are at oppositely balanced angles. This belt configuration is referred to as helically-offset-tooth (HOT) design, and is disclosed in U.S. Pat. No. 5,209,705.

The outer toothed surface 4 is reinforced with an abrasion resistance fabric 7. The fabric 7 is defined by warp 10 and weft 11 yarns. The warp yarns 10 extend in the transverse direction T while the weft yarns 11 extend in the longitudinal direction L.

Figure 2:
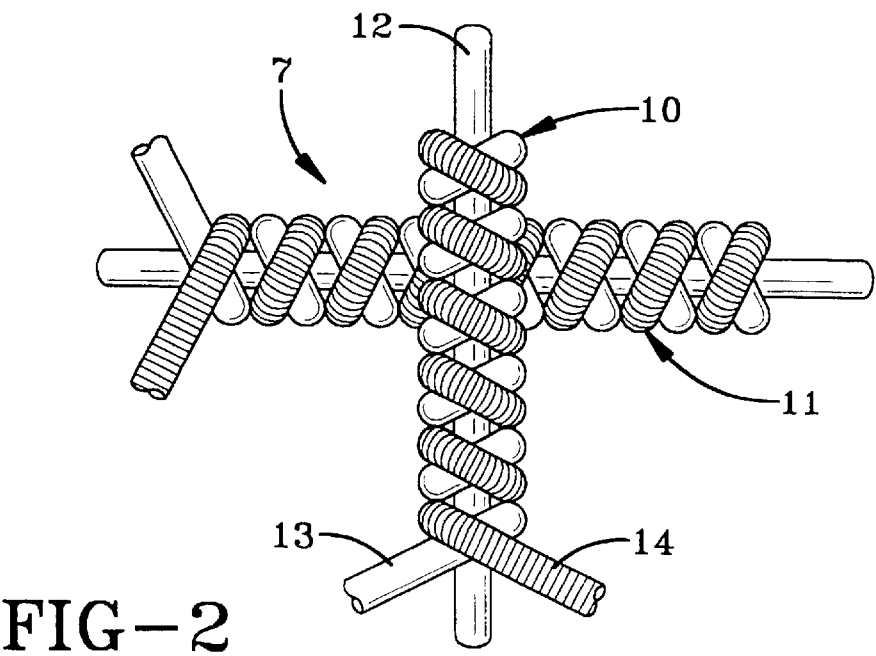
FIG. 2 illustrates the disclosed fabric.

FIG. 2 is illustrative of the fabric construction used for the inventive belt. The fabric 7 is a bi-directional stretch material, with a scaffold construction. Each warp 10 and weft 11 yarn is a composite yarn comprised of a core yarn 12 around which is wound at least one other yarn 13 or 14. Illustrated is a second yarn 13 wrapped around the core yarn 12, which in turn is wrapped by a third yarn 14. When both the second yarn 13 and the third yarn 14 are used in the fabric 7, the second yarn 13 is wound in one direction about the core yarn 12, while the third yarn 14 is wound over the second yarn 13 in the reverse direction. When only one yarn 13 or 14 is employed, the yarn 13 or 14 may be wrapped in either direction.

The composite structure of both the warp 10 and weft 11 yarns enable the material to stretch in both directions. In constructing the fabric 7, each warp 10 and weft 11 yarn may be provided with only a single outer yarn 13 or 14. In such a construction, the fabric 7 will exhibit the same stretch characteristics in both directions. If the fabric 7 is constructed with second yarns 13 and third yarns 14 on both the warp 10 and weft 11 threads, similarly, the fabric 7 will exhibit the same stretch characteristics in both directions. If so desired by the tooth inclination angle, wherein it is desired to have stretch characteristics in one direction greater than in the opposing direction, the fabric 7 may be formed with either the warp 10 or weft 11 yarn provided with both second 13 and third 14 yarns while the other yarn 10 or 11 is provided with only a single wrapped yarn 13 or 14.

The yarns of the fabric 7 are selected from among those known and conventional in the art. Examples of such suitable yards are nylon (all types), nylon-rayon blend, aramid, aramid-rayon blend, aramid-nomex, acrylic, acrylic-rayon blend, polyester, cotton-polyester blend, rayon, cotton, and cotton-rayon blend. The yarns employed in this invention can be either filaments or second yarns produced in the conventional manner. The resulting scaffolding material 7 can be a combination of filament and second yarns, the selection depending upon the desired abrasion characteristics and/or cost of the material. Preferred materials, for illustrative purposes only, are spandex for the core yarn 12 and nylon for the outer second 13 and/or third 14 yarns.

In preparation of the fabric 7, the cut fabric 7 is dipped in conventional resorcinol-formaldehyde-latex (RFL) solution and allowed to cure. The formulation of the RFL solution is selected, in accordance with conventional techniques in the art, to be compatible with the elastomer selected for the body of the belt. The dipping and subsequent curing are accomplished without any additional stretching of the fabric 7.

During belt manufacturing, for example in accordance with the methods disclosed in U.S. Pat. No. 5,733,399, the cured, unstretched bi-directional stretch fabric 7 is laid onto the mold, and at some point in the manufacturing process, the fabric 7 is pressed into the mold to form the outer surface of the belt teeth. Due to the bi-directional stretch of the fabric 7, easy deformation and reshaping of the fabric 7 permit any desired tooth configuration. When manufacturing HOT belts greater inclination angles for the teeth 5 can be achieved while maintaining the desired tooth profiling.

The fabric 7 also exhibits greater abrasion resistance for synchronous belts than conventional materials, such as a conventional bi-directional stretch fabric and square woven fabric. Belts 1 formed with the bi-directional scaffold stretch fabric 7 also have a greater belt life than belts formed with conventional knitted fabrics or conventional bi-directional stretch fabrics.

Due to the elastic nature of the disclosed fabric 7, stretching and deformation of the fabric 7 during molding creates interstices 9 between the warp 10 and weft 11 threads. The interstices vary in size, depending upon the location of the interstice relative to the mold shape. If the interstice is relatively large, the tooth stock 5 may flow into and beyond the fabric 7, known as rubber strikethrough. The rubber strikethrough is partly dependent upon differing cure rates and viscosities of the body stock 2 and tooth stock 8. For large sized belts, such as used in industrial applications, the rubber strikethrough is desired and the rubber forms the outer surface of the belting, as opposed to the fabric forming the outer surface.

For automotive or other transportation applications wherein the manufactured belt is of a comparatively smaller size, the fabric 7 forms the outer surface of the tooth and strikethrough needs to be minimized. To prevent rubber strikethrough a barrier layer 15 is placed between the tooth stock 8 and the fabric 7. The barrier layer 15, when applied during construction of the belt, is an uncured rubber compound. An effective barrier will prevent the tooth stock 8 from flowing into the interstices of the facing fabric 7. To achieve this an important property of the barrier compound is the cure rate. The cure rate of the barrier layer 15 must be faster than the cure rate of the tooth stock 8 or any other rubber in the belt 1. Preferably, the barrier compound exhibits a 10% elastic modulus in the range of 550–950 psi.

What is claimed is:

1. An improved drive belt (1), the belt (1) being comprised of at least one row of transversely extending teeth (5), and a fabric layer (7) reinforcing the outer surface of the teeth (4), the belt (1) being character by:

the fabric (7) being a woven bi-directional stretch fabric (7) comprising warp (10) and weft (11) yarns;

each warp (10) and weft (11) yarn comprising a first core yarn (12) with at least one second yarn (13) wound about the core yarn (12).

2. An improved drive belt (1) in accordance with claim 1 wherein either the warp (10) or weft (11) yarn comprise a further third yarn (14) wrapped around the second yarn (13) and the core yarn (12).

3. An improved drive belt (1) in accordance with claim 2 wherein the third yarn (14) is wound about the second yarn (13) in a direction opposite the second yarn (13).

4. An improved drive belt (1) in accordance with claim 1 wherein the elasticity of the core yarn (12) is greater than the elasticity of the second yarn (13).

5. An improved drive belt (1) in accordance with claim 2 wherein the elasticity of the first core yarn (12) is greater than the elasticity of the third yarn (14).

6. An improved drive belt (1) in accordance with claim 2 wherein the elasticity of the first core yarn (12) is greater than the elasticity of the second yarn (13) or the third yarn (14).

7. An improved drive belt (1) in accordance with claim 1 wherein the belt (1) comprises a barrier layer (15) located adjacent to the fabric layer (7), wherein
the barrier layer (15) is an elastomeric compound, and has a cure rate faster than any other elastomer in the belt (1).

8. An improved drive belt (1) in accordance with claim 7 wherein the barrier layer (15) has a 10% elastic modulus of 550–950 psi.

9. An improved drive belt (1) in accordance with claim 1 wherein the teeth (5) on the outer surface of the belt (1) extend obliquely in the longitudinal direction (L) of the belt (1).

10. An improved drive belt (1) in accordance with claim 1 wherein the teeth on the outer surface of the belt (1) are at least two transversely adjacent rows of teeth (5) having centerlines uniformly spaced apart in the longitudinal direction (L) by their pitch length (P) and extending obliquely to the longitudinal direction (L) such that the teeth (5) in the transversely adjacent rows are at oppositely balanced angles and the centerlines of the adjacent teeth (5) are offset from each other by a distance of from 10% to 90% of the pitch length P.

11. The drive belt (1) according to claim 1 wherein the yarns (12, 13, or 14) of the fabric (7) are selected from the group consisting of nylon, nylon-rayon blend, aramid, aramid-rayon blend, aramid-nomex, acrylic, acrylic-rayon blend, polyester, cotton-polyester blend, rayon, cotton, and cotton-rayon blend.

12. A method of forming an improved drive belt (1) for industrial application comprising providing a resilient elastomer belt (1) body, forming at least one row of transversely extending teeth (5), and reinforcing the teeth (5) with an abrasion fabric (7), the method characterized by:
forming the abrasion fabric (7) from a woven bi-directional stretch fabric (7) comprising weft (11) and warp (10) yarns, each warp (10) and weft (11) yarn comprising a first core yarn (12) with at least one second yarn (13) wound about the core yarn (12).

13. A method of forming an improved drive belt (1) in accordance with claim 12 wherein the either the weft (11) and warp (10) yarns comprise a further third yarn (14) wrapped around the second yarn (13).

14. A method of forming an improved drive belt (1) in accordance with claim 13 wherein the core yarn (12) of the weft (11) and warp (10) yarns has an elasticity greater than the elasticity of the second and third yarns (13 or 14).

15. A method of forming an improved drive belt (1) in accordance with claim 12, the method further comprising forming the at least one row of transversely extending teeth as at least two transversely adjacent rows of teeth (5) having centerlines uniformly spaced apart in the longitudinal direction (L) by their pitch length (P) and extending obliquely to the longitudinal direction (L) such that the teeth (5) in the transversely adjacent rows are at oppositely balanced angles and the centerlines of the adjacent teeth (5) are offset from each other by a distance of from 10% to 90% of the pitch length (P).

16. A method of forming an improved drive belt (1) according to claim 12 further comprising the preparation step of dipping the fabric layer (7) in a resorcinol-formaldyhde-latex without stretching of the fabric layer (7).

* * * * *